(No Model.)
H. DETREUX.
TRACTION VEHICLE.
No. 541,426. Patented June 18, 1895.
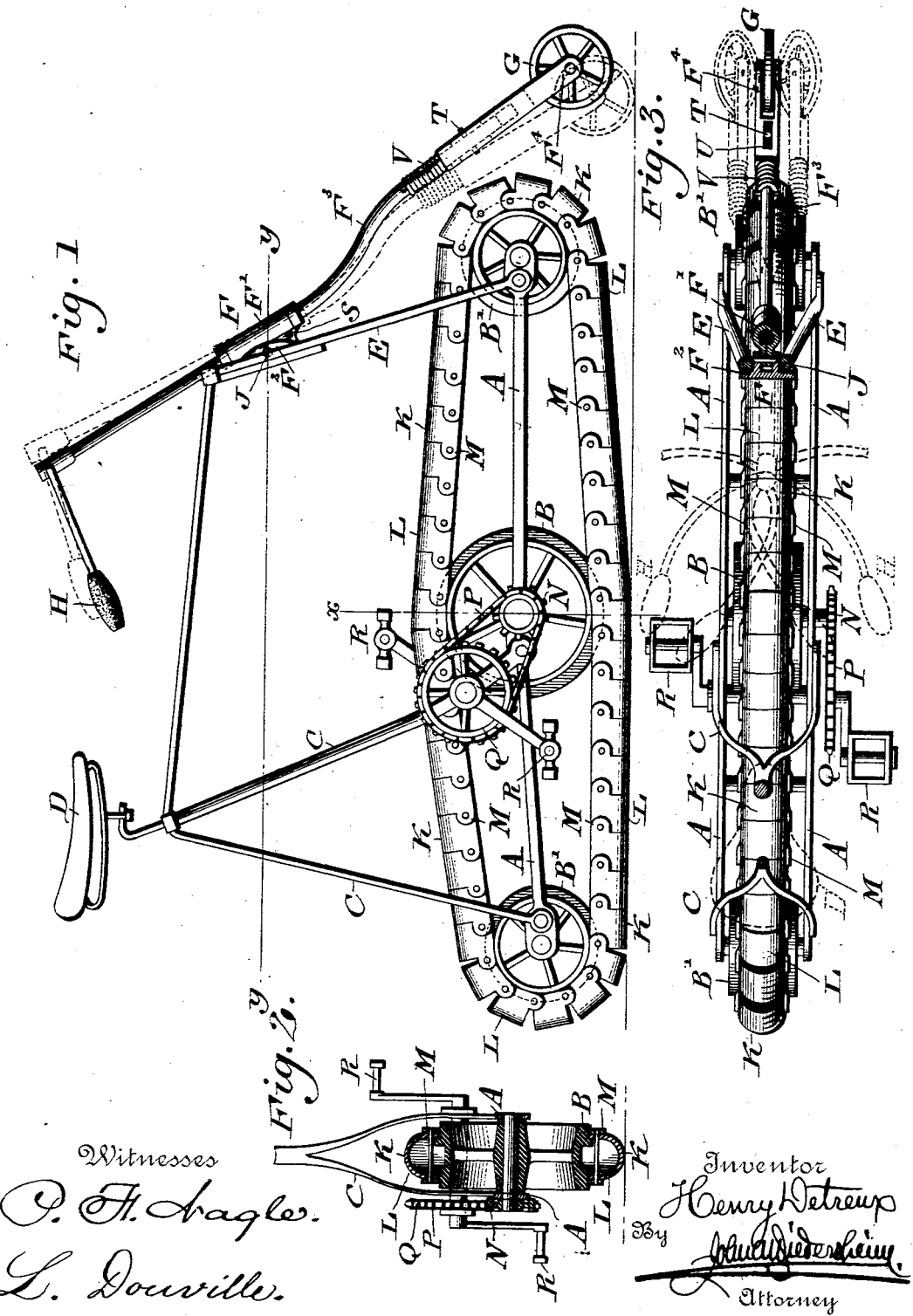
Witnesses
P. H. Aagle.
L. Douville.
Inventor
Henry Detreux
By
Attorney
THE NORRIS PETERS CO., PHOTO-LITHO., WASHINGTON, D. C.

UNITED STATES PATENT OFFICE.

HENRY DETREUX, OF PHILADELPHIA, PENNSYLVANIA.

TRACTION-VEHICLE.

SPECIFICATION forming part of Letters Patent No. 541,426, dated June 18, 1895.

Application filed November 26, 1894. Serial No. 530,006. (No model.)

*To all whom it may concern:*

Be it known that I, HENRY DETREUX, a citizen of the United States, residing in the city and county of Philadelphia, State of Pennsylvania, have invented a new and useful Improvement in Traction-Vehicles, which improvement is fully set forth in the following specification and accompanying drawings.

My invention consists of a vehicle having a traction device for propelling the same, consisting of a traveler which passes around the wheels of the vehicle, and receives motion from either of said wheels by means of pedals operated by the rider.

It also consists in providing the vehicle with a steering wheel, which may be raised and lowered for purposes requiring the same.

Figure 1 represents a side elevation of a traction-vehicle embodying my invention. Fig. 2 represents a vertical section on line $x$ $x$, Fig. 1. Fig. 3 represents a partial top view and partial horizontal section on line $y$ $y$, Fig. 1.

Similar letters of reference indicate corresponding parts in the several figures.

Referring to the drawings, A designates the frame of the vehicle, and B, B' designate the wheels of the same mounted on said frame in the same plane. Rising from said frame is the support C for the seat D, somewhat of the order of a bicycle, and also the support E, for the bearing F of the rod of the steering wheel G, said rod being provided with the handles H for evident purposes. The bearing F is formed of parts F', $F^2$, connected by the horizontally-arranged pin J, whereby said wheel G may be raised from the ground or floor, and lowered against the same when so desired.

K designates an endless traveler or traction device, which passes around the periphery of the wheels B, B' and is adapted to rest on the ground or floor, it being formed of links L, pivoted to each other, and having bodies somewhat U-shaped, and ears M which are connected with the adjacent bodies, the side edges of the bodies abutting, whereby while the traveler is of a flexible nature, the portion of the same in contact with the ground is sustained against upward deflection, and so runs firmly on the floor or ground.

The shaft of one of the wheels, say B, has connected with it the sprocket wheel N, around which passes the chain P, which also passes around the sprocket wheel Q, whose shaft has attached to it the pedals R, whereby motion may be imparted to said wheel Q, and consequently to the traveler K, which is in contact with the periphery of said wheel, it being evident that said traveler is then moved, and as it runs on the ground or floor, the vehicle will be propelled in an effective, rapid, uniform and easy manner, while the peripheries of the wheels contact with the upper edges of the lower portions of the traveler, and are sustained thereon, it being noticed that the traveler provides a track for the vehicle, as well as the means for imparting the power of the rider to the same.

The wheel B is of greater diameter than the wheels B', so that the portion of the traveler rearward of said wheel B may run flat on the ground or floor, while the position of the same in front of said wheel will be raised from the ground or floor, and thus move with greater freedom and without serious interference of obstructions in the path ahead of the same. The said construction also serves to permit an easier turning of the vehicle, as the same can be balanced or supported on the portion of the chain immediately below the central or larger wheel. The wheels are peripherally flanged to prevent displacement of the traveler therefrom, the flanges entering the spaces formed by the U-shaped bodies of the links, while the peripheries proper rotate on the edges of said bodies, and are sustained thereon.

On the part $F^2$ of the bearing F are the pins S, the same being adapted to abut against the part F', and limit the downward motion of the wheel G.

The rod $F^3$ of the steering wheel G is connected telescopically with the fork $F^4$ of said wheel, and provided with a pin T which passes through the slot U in said fork.

Fitted to the rod $F^3$, and bearing against the upper end of the fork, is a spring V, which serves to keep said fork in position, and receives the strain or blows to which the steering wheel may be subjected.

Having thus described my invention, what I claim as new, and desire to secure by Letters Patent, is—

1. In a traction vehicle, a frame, front, rear and intermediate wheels, mounted thereon, an endless chain passing around said wheels, a seat mounted on said frame, a pedal shaft mounted on said frame and carrying a sprocket wheel, a chain connection with said sprocket wheel and a sprocket wheel on the shaft of said intermediate wheel, and a seat on said frame, said endless chain being in contact with the peripheries of said front, rear and intermediate wheels, and said intermediate wheel being of wider diameter than said front and rear wheels said parts being combined substantially as described.

2. In a traction vehicle, a wheel having a peripheral flange between the sides thereof, in combination with an endless traveler consisting of pivoted limbs of U-shape, having the ears M, said limbs riding on the periphery of said wheel outside of said flange, substantially as described.

3. A traction vehicle having end and intermediate wheels with an endless chain in contact with the peripheries thereof, said intermediate wheel being of greater diameter than said end wheels, substantially as described.

4. In a traction vehicle, a main frame having the support E, the bearing F formed of the parts F', F², connected by the pin J, a steering rod F⁸ having a bearing in said part F', the fork F⁴ with the steering wheel G mounted therein, and a spring connected with said rod, and bearing against said fork, said rod having a pin therein working in a slot in said fork, said parts being combined substantially as described.

HENRY DETREUX.

Witnesses:
JOHN A. WIEDERSHEIM,
R. H. GRAESER.